United States Patent
Kim et al.

(10) Patent No.: US 10,649,096 B2
(45) Date of Patent: May 12, 2020

(54) WEARABLE TERMINAL FOR DISPLAYING NAVIGATION INFORMATION, NAVIGATION DEVICE AND DISPLAY METHOD THEREFOR

(71) Applicant: HYUNDAI MNSOFT, INC., Seoul (KR)

(72) Inventors: Jong Gon Kim, Seoul (KR); Jung Eun Kim, Seoul (KR); Bo Mi Yu, Seoul (KR)

(73) Assignee: HYUNDAI MNSOFT, INC., Seoul (KR)

( * ) Notice: Subject to any disclaimer, the term of this patent is extended or adjusted under 35 U.S.C. 154(b) by 393 days.

(21) Appl. No.: 15/515,526

(22) PCT Filed: Sep. 25, 2015

(86) PCT No.: PCT/KR2015/010215
§ 371 (c)(1),
(2) Date: Mar. 29, 2017

(87) PCT Pub. No.: WO2016/052955
PCT Pub. Date: Apr. 7, 2016

(65) Prior Publication Data
US 2017/0227655 A1    Aug. 10, 2017

(30) Foreign Application Priority Data
Sep. 29, 2014   (KR) .......................... 10-2014-0130201

(51) Int. Cl.
*G01S 19/42*    (2010.01)
*G06F 1/16*     (2006.01)
(Continued)

(52) U.S. Cl.
CPC ............ *G01S 19/42* (2013.01); *G01C 21/165* (2013.01); *G06F 1/163* (2013.01); *G06F 3/014* (2013.01);
(Continued)

(58) Field of Classification Search
CPC .......... G01S 19/42; G01S 19/38; G01S 19/45; G01C 21/165; G01C 21/3632;
(Continued)

(56) References Cited

U.S. PATENT DOCUMENTS 7,747,409 B2 * 6/2010 Ladetto ................ G01C 21/165
                                                          702/150
9,595,181 B2 * 3/2017 Katingari ............... G08B 25/10
(Continued)

FOREIGN PATENT DOCUMENTS

CN        102818572 A    12/2012
CN        103106014 A     5/2013
(Continued)

*Primary Examiner* — Chuong P Nguyen
(74) *Attorney, Agent, or Firm* — Morgan, Lewis & Bockius LLP

(57) ABSTRACT

A wearable terminal may include: a terminal mode determination unit configured to determine any one of a plurality of terminal modes based on a use state of the terminal; an information output unit configured to display navigation information; a layout database configured to store a layout to be displayed on the information output unit, in response to each of the terminal modes; and a control unit configured to extract a layout corresponding to the determined terminal mode from the layout database, construct navigation information according to the extracted layout, and output the navigation information through the information output unit.

16 Claims, 9 Drawing Sheets

(51) Int. Cl.
*G06F 3/01* (2006.01)
*G06F 3/0346* (2013.01)
*G01C 21/16* (2006.01)
*G06K 9/00* (2006.01)
*G06F 13/14* (2006.01)
*G01C 21/36* (2006.01)
*G06F 3/03* (2006.01)
*G06F 1/3231* (2019.01)
*G06F 1/3234* (2019.01)

(52) U.S. Cl.
CPC ............ *G06F 3/017* (2013.01); *G06F 3/0346* (2013.01); *G06K 9/00221* (2013.01); *G06K 9/00335* (2013.01); *G01C 21/3632* (2013.01); *G01C 21/3644* (2013.01); *G06F 1/3231* (2013.01); *G06F 1/3265* (2013.01); *G06F 3/01* (2013.01); *G06F 3/0304* (2013.01); *G06F 13/14* (2013.01); *Y02D 10/153* (2018.01)

(58) Field of Classification Search
CPC ....... G01C 21/3644; G06F 3/01; G06F 3/014; G06F 3/017; G06F 3/0304; G06F 3/034; G06F 1/163; G06K 9/00221; G06K 9/00335
USPC .......... 342/357.25, 357.21, 357.28; 701/408; 340/539.13
See application file for complete search history.

(56) References Cited

U.S. PATENT DOCUMENTS

| | | | | |
|---|---|---|---|---|
| 10,267,637 | B2* | 4/2019 | Jeong | G01C 21/00 |
| 10,345,426 | B2* | 7/2019 | Miller | G01S 5/0294 |
| 10,345,761 | B2* | 7/2019 | Mizunuma | G04B 47/06 |
| 2009/0091477 | A1* | 4/2009 | McCall | G01S 19/42 |
| | | | | 340/990 |
| 2011/0141006 | A1 | 6/2011 | Rabu et al. | |
| 2013/0261962 | A1* | 10/2013 | Takaoka | G01C 21/16 |
| | | | | 701/472 |
| 2014/0125618 | A1 | 5/2014 | Panther et al. | |
| 2015/0123898 | A1* | 5/2015 | Kim | H04L 51/24 |
| | | | | 345/156 |
| 2016/0259422 | A1* | 9/2016 | Funase | G06F 3/017 |
| 2016/0313126 | A1* | 10/2016 | Lemarchand | G01C 21/16 |
| 2017/0347237 | A1* | 11/2017 | Varshavsky | H04W 4/029 |
| 2019/0053154 | A1* | 2/2019 | Song | H04W 52/0216 |

FOREIGN PATENT DOCUMENTS

| | | |
|---|---|---|
| CN | 104024987 A | 9/2014 |
| KR | 10-2011-0061428 A | 6/2011 |
| KR | 10-2013-0107517 A | 10/2013 |
| KR | 10-2014-0084461 A | 7/2014 |
| WO | WO 2014/057371 A1 | 4/2014 |

* cited by examiner

FIG. 8

| TERMINAL MODE | LAYOUT | LAYOUT FOR NAVIGATION INFORMATION | | |
|---|---|---|---|---|
| | | SURROUNDINGS GUIDE NAVIGATION INFORMATION | PATH GUIDE NAVIGATION INFORMATION | CHARGING STATION GUIDE NAVIGATION INFORMATION |
| TERMINAL WATCHING MODE | MAP INFORMATION LAYOUT |  <1-1 LAYOUT> | 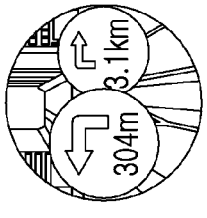 <2-1 LAYOUT> | 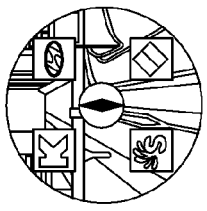 <3-1 LAYOUT> |
| WALKING MODE | MINI-INFORMATION LAYOUT | 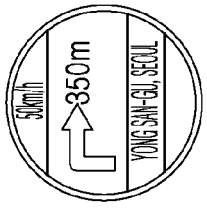 <1-2 LAYOUT> | 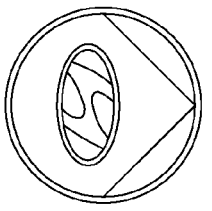 <2-2 LAYOUT> | 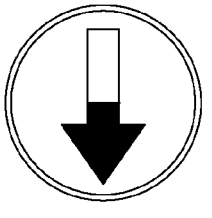 <3-2 LAYOUT> |
| WALKING STOP MODE | SIGN INFORMATION LAYOUT |  <1-3 LAYOUT> | 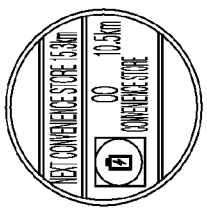 <2-3 LAYOUT> | 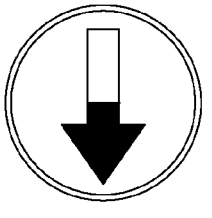 <3-3 LAYOUT> |

FIG. 9

| DIVISION | TERMINAL WATCHING MODE | WALKING MODE | WALKING STOP MODE | EXCEPTION MODE |
|---|---|---|---|---|
| SITUATION | STARE AT SCREEN | ARM IS SWUNG | ARM IS PERPENDICULAR TO GROUND SURFACE | ANGLE OUT OF SWING ANGLE OF ARM IS DEFINED AS "EXCEPTION ANGLE" SWING ANGLE |
| ACCELERATION/ GYRO SENSOR | DETERMINE MODE BY RECOGNIZING SITUATION IN WHICH TERMINAL STAYS AT SPECIFIC ANGLE(ANGLE AT WHICH USER STARES AT WATCH) FOR PREDETERMINED TIME<br><br>SPECIFIC ANGLE NEEDS TO BE SELECTED IN CONSIDERATION OF ERROR RANGE | DETERMINE MODE BY RECOGNIZING SITUATION IN WHICH ARM IS SWUNG | DETERMINE MODE BY RECOGNIZING SITUATION IN WHICH ARM IS PERPENDICULAR TO GROUND SURFACE | DETERMINE AS EXCEPTION MODE |
| INFORMATION AMOUNT | [LARGEST INFORMATION AMOUNT] RECOGNIZABLE AMOUNT OF INFORMATION IS DISPLAYED BECAUSE TIME DURING WHICH USER CAN RECOGNIZE INFORMATION INCREASES WHILE USER WATCHES SCREEN FOR PRESET TIME | [INTERMEDIATE INFORMATION AMOUNT] ONLY SIMPLE INFORMATION IS EXPOSED BECAUSE TIME DURING WHICH USER WATCHES SCREEN DECREASES WHEN ARM IS CONSTANTLY BEING SWUNG | [SMALLEST INFORMATION AMOUNT] ONLY MINIMUM AMOUNT OF INFORMATION IS EXPOSED WHEN ARM IS CONSIDERABLY OUT OF SIGHT | LCD Off |
| SCREEN MODE | [TERMINAL WATCHING MODE] SIMILAR TO EXISTING MAP<br><br>LARGEST DISPLAYED INFORMATION AMOUNT SMALLEST INFORMATION SIZE LARGEST NUMBER OF DISPLAYED COLORS LARGEST COGNITIVE LOAD | [WALKING MODE] DISPLAY REPRESENTATIVE POI IN FOUR DIRECTIONS<br><br>LARGEST DISPLAYED INFORMATION AMOUNT SMALLEST INFORMATION SIZE LARGEST NUMBER OF DISPLAYED COLORS LARGEST COGNITIVE LOAD | [WALKING STOP MODE] DISPLAY ONE REPRESENTATIVE POI AHEAD<br><br>SMALLEST DISPLAYED INFORMATION AMOUNT LARGEST INFORMATION SIZE SMALLEST NUMBER OF DISPLAYED COLORS SMALLEST COGNITIVE LOAD | LCD Off |
| INFORMATION OUTPUT | [SURROUNDINGS GUIDE] LARGEST INFORMATION AMOUNT SIMILAR TO EXISTING MAP | [SURROUNDINGS GUIDE] INTERMEDIATE INFORMATION AMOUNT DISPLAY REPRESENTATIVE POI IN FOUR DIRECTIONS | [SURROUNDINGS GUIDE] SMALLEST INFORMATION AMOUNT DISPLAY ONE REPRESENTATIVE POI AHEAD | LCD Off |

FIG. 10

| | SURROUNDINGS GUIDE NAVIGATION INFORMATION | PATH GUIDE NAVIGATION INFORMATION | CHARGING STATION GUIDE NAVIGATION INFORMATION |
|---|---|---|---|
| NAVIGATION TERMINAL SCREEN | 1010 | 1021 | 1030 |
| WEARABLE TERMINAL SCREEN IN TERMINAL WATCHING MODE | 1011 | 1022 | 1031 |
| WEARABLE TERMINAL SCREEN IN WALKING MODE | 1012 | 1023 | 1032 |
| WEARABLE TERMINAL SCREEN IN WALKING STOP MODE | 1013 | 1024 | 1033 |

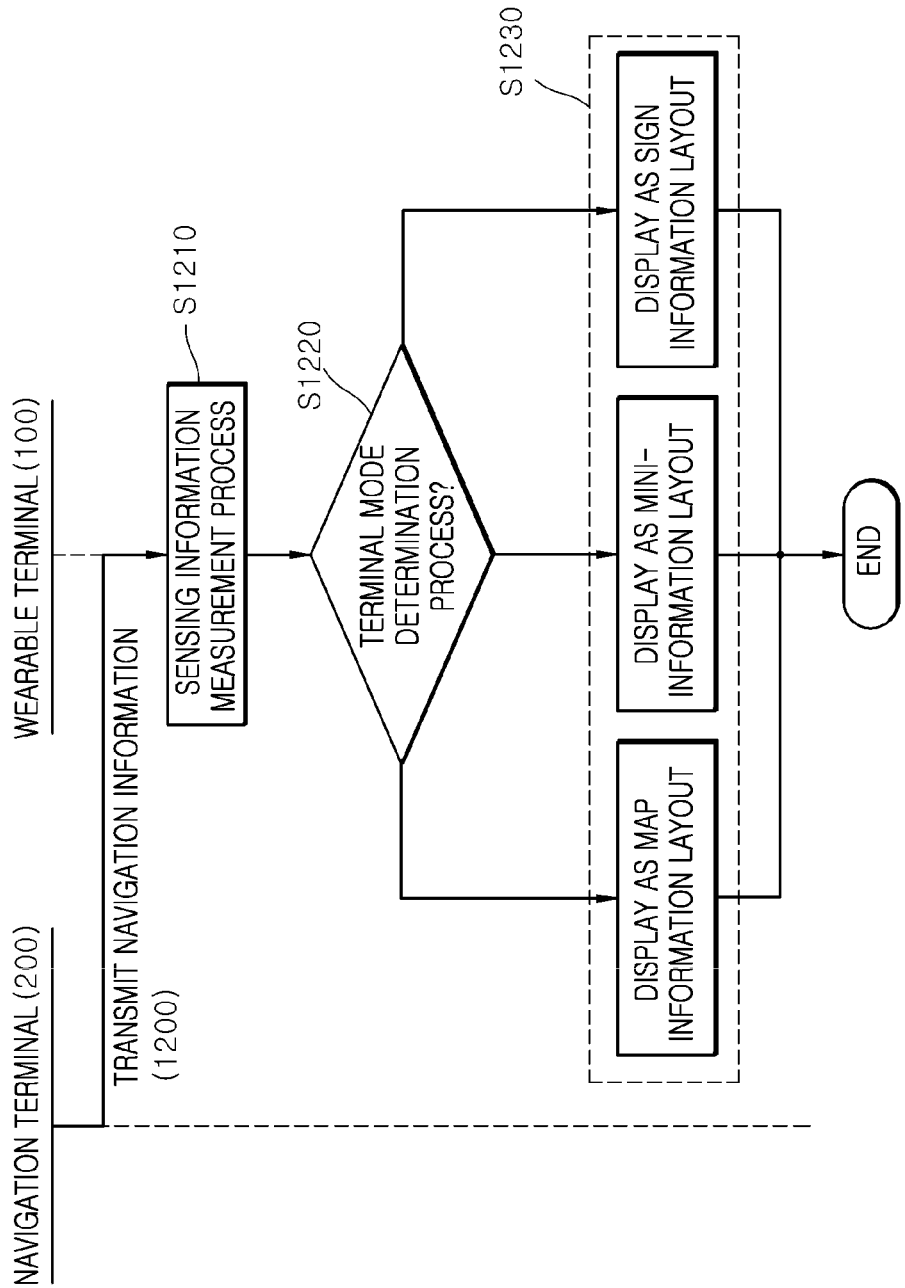

WEARABLE TERMINAL FOR DISPLAYING NAVIGATION INFORMATION, NAVIGATION DEVICE AND DISPLAY METHOD THEREFOR

CROSS-REFERENCE TO RELATED APPLICATION

This application is a U.S. National Phase of International Patent Application No. PCT/KR2015/010215, filed on Sep. 25, 2015, which claims priority to Korean Application No. 10-2014-0130201, filed on Sep. 29, 2014, the disclosures of which are incorporated herein by reference in their entirety for all purposes.

BACKGROUND OF THE INVENTION

Field of the Invention

The present invention relates to a wearable terminal for displaying navigation information, an information display method of a wearable terminal, a navigation device and a navigation information display method.

Description of Related Art

Recently, navigation systems have been popularized. The navigation system is installed in a vehicle, receives a coordinate signal indicating the current location of the vehicle from GPS (Global Positioning System), and applies map data to guide path information to the destination. Such a navigation system may be divided into a vehicle-dedicated navigation system and a smart phone navigation system driven by a navigation application, depending on the availability range thereof.

Since the vehicle-dedicated navigation system has a large screen capable of providing satisfactory visibility and does not require a separate connection cable, the inside of a vehicle can be neatly organized after the vehicle-dedicated navigation system is installed in the vehicle. However, when only the functions of the vehicle-dedicated navigation system are used, the vehicle-dedicated navigation system has a high price compared to performance, and is used at a low frequency. Furthermore, it is quite cumbersome to update map data of the vehicle-dedicated navigation system.

On the other hand, the smart phone navigation system driven by a navigation application installed in a smart phone does not require a separate navigation device, but utilizes a smart phone carried by an individual. Thus, the smart phone navigation system requires almost no installation cost. However, since the smart phone navigation system displays all pieces of navigation information on a small screen of the smart phone, the visibility thereof is inevitably degraded. Therefore, there is an increasing demand for a terminal device which can replace a smart phone to display only necessary information, thereby providing high visibility.

Recently, a wearable terminal such as a smart watch, which is operated in wireless connection with a smart phone, has been popularized. The wearable terminal may include a smart watch and the like, which can be attached on the body. However, despite the popularization of wearable terminals, the development of wearable terminals capable of effectively displaying navigation information in connection with a navigation terminal stays at an insignificant level. Therefore, there is a demand for the development of such wearable terminals.

The related art of the present invention is disclosed in Korean Patent Publication No. 2014-0084461.

BRIEF SUMMARY

Various embodiments of the present invention are directed to a wearable terminal capable of effectively performing navigation guide. Also, various embodiments of the present invention are directed to a technique for providing a layout screen considering a walking state of a pedestrian wearing a wearable terminal.

In an embodiment, a wearable terminal may include: a terminal mode determination unit configured to determine any one of a plurality of terminal modes based on a use state of the terminal; an information output unit configured to display navigation information; a layout database configured to store a layout to be displayed on the information output unit, in response to each of the terminal modes; and a control unit configured to extract a layout corresponding to the determined terminal mode from the layout database, construct navigation information according to the extracted layout, and output the navigation information through the information output unit.

The wearable terminal may further include a sensor input unit configured to receive sensing information for determining the use state of the terminal. The terminal mode determination unit may determine the terminal mode based on the sensing information, and the plurality of terminal modes may include two or more of a terminal watching mode in which a user watches the screen of the wearable terminal, a walking mode in which the wearable terminal is being swung, and a walking stop mode in which the wearable terminal is not moved for a preset time.

The sensor input unit may include: a camera configured to take an image; and a motion measurement sensor configured to measure a motion of the wearable terminal.

The terminal mode determination unit may set the terminal watching mode to the terminal mode when an eye shape or face shape is detected through the camera and a swing of the wearable terminal is not detected through the motion measurement sensor, set the walking mode to the terminal mode when a motion of the wearable terminal is detected through the motion measurement sensor, and set the walking stop mode to the terminal mode when an eye shape or face shape is not detected through the camera and the time during which a motion of the wearable terminal is not detected through the motion measurement sensor lasts for at least a preset time.

When the motion range of the wearable terminal, detected through the motion measurement sensor, is out of a preset critical range, the control unit may turn off the information output unit not to display navigation information.

The layout database may store a first layout displaying a first information amount and allocated to the terminal watching mode, a second layout displaying a second information amount and allocated to the walking mode, and a third layout displaying a third information amount and allocated to the walking stop mode.

The displayed first to third information amounts may have a relation of (first information amount>second information amount>third information amount), and the first layout may be a map information layout displaying the first information amount in the terminal watching mode, the second layout may be a mini-information layout displaying the second information amount in the walking mode, and the third layout may be a sign information layout displaying the third information amount in the walking stop mode.

The map information layout, the mini-information layout and the sign information layout may be differently constructed for each piece of navigation information to be outputted through the information output unit.

When the navigation information is surroundings guide navigation information, the map information layout may be where the entire screen is displayed in the form of a map, the mini-information layout may be where the map-displayed screen is divided into a plurality of parts and representative pieces of guide information in the respective parts are displayed on the respective parts of the map, and the sign information layout may be where only one piece of representative guide information in a traveling direction is displayed as a sign.

When the navigation information is path guide navigation information, the map information layout may be where a distance to a traveling direction changing point and a traveling direction are displayed on the map screen, the mini-information layout may be where only the distance to the traveling direction changing point and the traveling direction are displayed, and the sign information layout may be where the traveling direction is displayed only with an arrow when a vehicle reaches the traveling direction changing point.

When the navigation information is charging station guide navigation information, the map information layout may be where distances to the nearest charging station and the second nearest charging station and the name of the nearest charging station are displayed, the mini-information layout may be where the distance to the nearest charging station and the name of the nearest charging station are displayed, and the sign information layout may be where a remaining distance to a charging station is displayed in a color and the charging station is displayed as a sign.

The control unit may set priorities for the respective pieces of navigation information, and output the navigation information through the information output unit in descending order of priories.

In another embodiment, an information display method of a wearable terminal may include: determining, by a terminal mode determination unit, any one of a plurality of terminal modes based on a use state of the terminal; and extracting, by a control unit, a layout corresponding to the determined terminal mode from the layout database, constructing navigation information according to the extracted layout, and outputting the navigation information through an information output unit. The layout database may store a layout of information to be displayed on the information output unit in response to each of the terminal modes.

The information display method may further include receiving, by a sensor input unit, sensing information for determining the use state of the terminal. The terminal mode determination unit may determine the terminal mode based on the sensing information, and the plurality of terminal modes may include two or more of a terminal watching mode in which a user watches the screen of the wearable terminal, a walking mode in which the wearable terminal is being swung, and a walking stop mode in which the wearable terminal is not moved for a preset time.

In another embodiment, a navigation information display device may include: a navigation terminal configured to transmit navigation information; and a wearable terminal configured to receive the navigation information from the navigation terminal, differently construct a layout displayed on a screen depending on a terminal mode, and display the navigation information. The wearable terminal may include: a sensor input unit configured to receive sensing information for determining a use state of the terminal; a terminal mode determination unit configured to determine any one of a plurality of terminal modes based on the sensing information; an information output unit configured to display the navigation information; a layout database configured to store a layout to be displayed on the information output unit, in response to each of the terminal modes, and a control unit configured to extract a layout corresponding to the determined terminal mode from the layout database, construct navigation information according to the extracted layout, and output the navigation information through the information output unit. The plurality of terminal modes may include two or more of a terminal watching mode in which a user watches the screen of the wearable terminal, a walking mode in which the wearable terminal is being swung, and a walking stop mode in which the wearable terminal is not moved for a preset time.

In another embodiment, a navigation information display method may include: transmitting, by a navigation terminal, navigation information to a wearable terminal; receiving, by the wearable terminal, sensing information for determining a use state of the terminal; determining, by the wearable terminal, any one of a plurality of terminal modes based on the sensing information; extracting, by the wearable terminal, a layout corresponding to the determined terminal mode from the layout database, constructing navigation information according to the extracted layout, and outputting the navigation information through the information output unit. The layout database may store a layout of information to be displayed on the information output unit in response to each of the terminal modes, and the plurality of terminal modes may include two or more of a terminal watching mode in which a user watches the screen of the wearable terminal, a walking mode in which the wearable terminal is being swung, and a walking stop mode in which the wearable terminal is not moved for a preset time.

According to the embodiments of the present invention, the navigation information can be effectively displayed on the wearable terminal, such that a user can easily recognize the navigation information. Furthermore, the layout may be differently displayed depending on the terminal mode based on the walking state of a pedestrian wearing the wearable terminal, which makes it possible to effectively perform navigation information guide.

BRIEF DESCRIPTION OF THE DRAWINGS

FIG. 8 is a layout database in accordance with the embodiment of the present invention.

FIG. 9 is a table showing terminal modes and information on the terminal modes.

FIG. 10 is a diagram illustrating display screens of a navigation terminal and display screens of the wearable terminal, based on navigation information.

FIG. 12 is a flowchart illustrating an information display process of the wearable terminal which receives navigation

DETAILED DESCRIPTION

Figure 1:
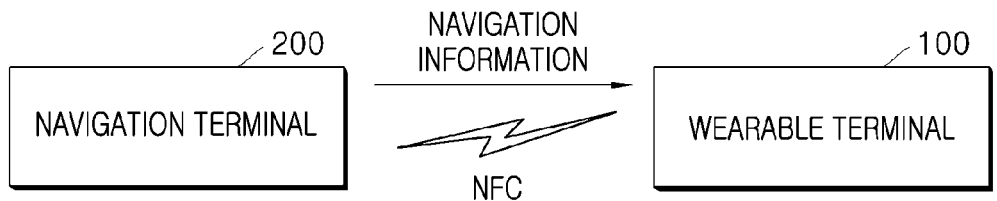
FIG. 1 is a configuration diagram illustrating a navigation information display device in accordance with an embodiment of the present invention.

Hereafter, embodiments of the present invention will be described in detail with reference to the accompanying drawings. However, the present invention may be embodied into various different forms, and not limited to the embodiments. Furthermore, in order to clarify the present invention, components having no relation with the descriptions are omitted, and like reference numerals in the drawings represent the same components.

Figure 2:
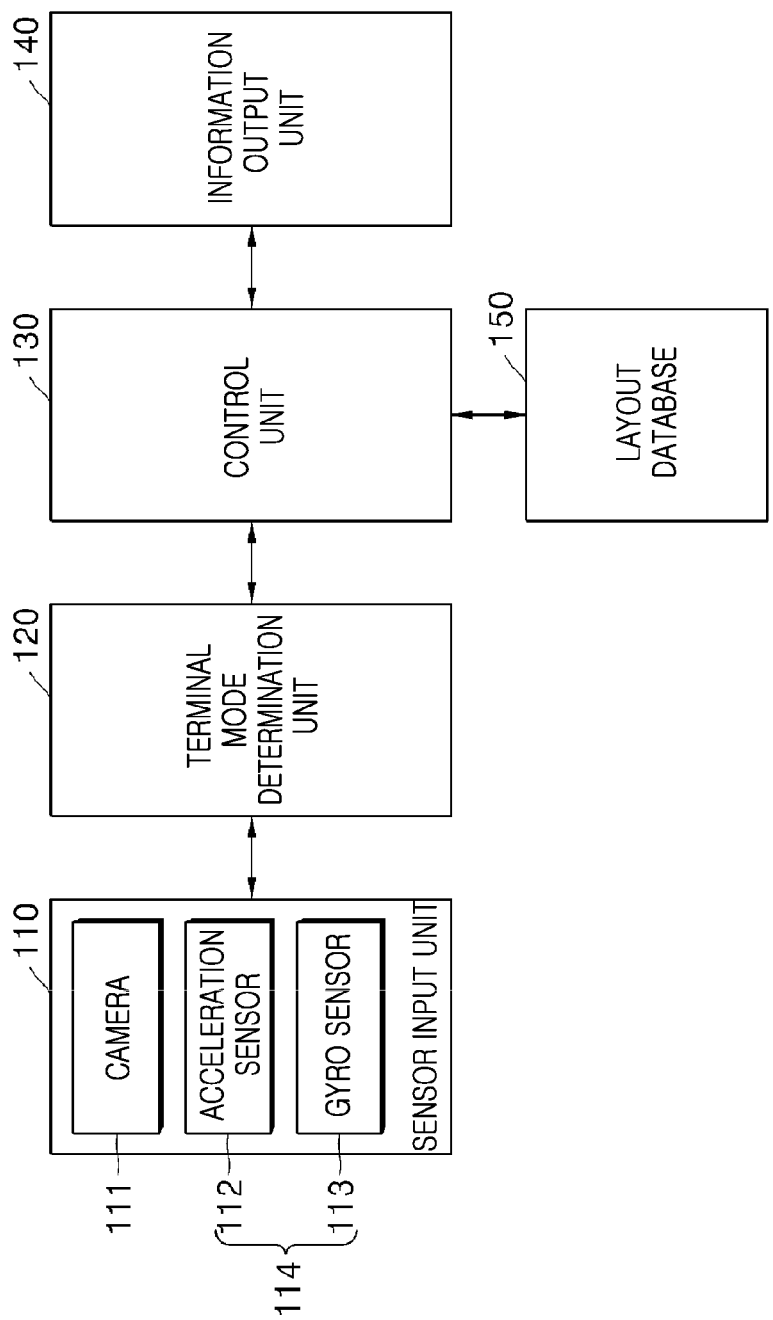
FIG. 2 is a configuration block diagram of a wearable terminal in accordance with an embodiment of the present invention.

FIG. 1 is a configuration diagram of a navigation information display device in accordance with an embodiment of the present invention, and FIG. 2 is a configuration block diagram of a wearable terminal in accordance with an embodiment of the present invention.

The navigation information display device includes a navigation terminal 200 and a wearable terminal 100. The navigation terminal 200 generates navigation information and displays the generated information on the entire screen, and the wearable terminal 100 displays navigation information received from the navigation terminal 200.

The navigation terminal 200 generates navigation information and transmits the generated navigation information to the wearable terminal 100. The navigation terminal 200 refers to a terminal that outputs navigation information, and may include various shapes or types of navigation devices such as a vehicle-dedicated navigation system which is mounted in a vehicle and outputs navigation information and a smart phone navigation system driven by a navigation application. When the navigation terminal 200 is a smart phone, a navigation application may be installed in the smart phone, and the navigation terminal 200 may generate navigation information and wirelessly transmit the generated information to the wearable terminal 100. The navigation information may include surroundings guide navigation information, path guide navigation information and charging station guide navigation information. For reference, the surroundings guide navigation information refers to information displaying facilities around the current location on the navigation map, the path guide navigation information refers to a drive path guide information to a destination, and the charging station guide navigation information refers to information indicating the location of a charging station such as a convenience store, when the smart phone or wearable terminal needs to be charged. Between the navigation terminal 200 and the wearable terminal 100, navigation information may be transmitted through NFC (Near Field Communication) such as Bluetooth. For reference, the navigation application may have been mounted on the corresponding smart phone when the smart phone was released, or may be downloaded from Google Market or the like and installed in the smart phone. When the navigation application is executed, the navigation terminal 200 may be automatically connected to the wearable terminal 100 through NFC.

The process of guiding a charging station may be performed as follows. First, when the smart phone or wearable terminal checks the battery power level thereof and determines that the smart phone or wearable terminal needs to be charged because the battery power level is below a predetermined level, the smart phone or wearable terminal sends to a central center information indicating that charging is required and the location information thereof. Then, the central center provides information on charging stations (for example, convenience store) around the location to the corresponding smart phone or wearable terminal, based on the location information.

Figure 3:
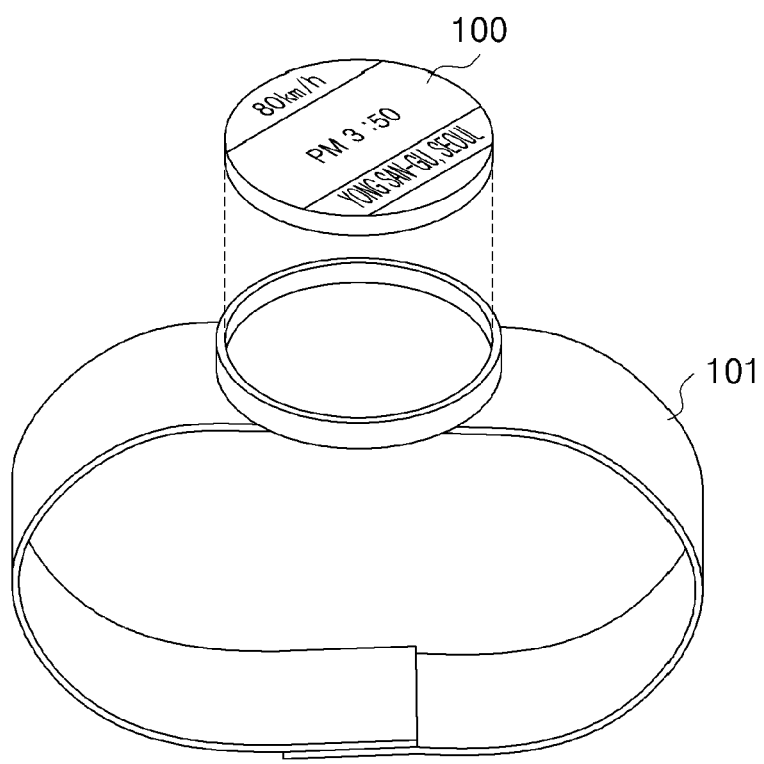
FIG. 3 is a diagram illustrating a wearable terminal.

The wearable terminal 100 determines a terminal mode, differently constructs a layout displayed on the screen depending on the terminal mode, and displays navigation information on the screen. The wearable terminal 100 refers to a small terminal such as a smart watch, which can be attached on the body or mounted on a separate mounting stand and output information in connection with the smart phone. For example, the wearable terminal 100 may be implemented in the form of a watch. As illustrated in FIG. 3, the wearable terminal 100 may be implemented in the form of a watch and separated from a watch chain 101. The navigation information displayed on the wearable terminal 100 may include not only navigation information received from the navigation terminal 200 but also navigation information generated by the wearable terminal 100.

As illustrated in FIG. 2, the wearable terminal 100 includes a sensor input unit 110, a terminal mode determination unit 120, a layout database 150, an information output unit 140 and a control unit 130.

The sensor input unit 110 receives sensing information for determining the state of the wearable terminal 100. The sensor input unit 110 may include a camera and a motion measurement sensor 114. The camera 111 may take an image, and the motion measurement sensor 114 may measure a motion of the terminal. The motion measurement sensor 114 may include an acceleration sensor 112 capable of sensing acceleration and a gyro sensor 113 capable of measuring a swing angle using the rotational inertia. Therefore, the sensing information may include an image, a motion measurement value, a swing angle and the like. For reference, the acceleration sensor 112 may measure X-axis, Y-axis and Z-axis accelerations, and the gyro sensor 113 may measure X-axis, Y-axis and Z-axis swing angles.

The terminal mode determination unit 120 may set a terminal mode to any one of a terminal watching mode, a walking mode and a walking stop mode, based on the measured sensing information. The terminal watching mode may refer to a mode in which a user watches the screen of the wearable terminal 100, the walking mode may refer to a mode in which the wearable terminal 100 is shaken, and the walking stop mode may refer to a mode in which the wearable terminal 100 is not moved for a predetermined time.

Figures 4, 5, 6:
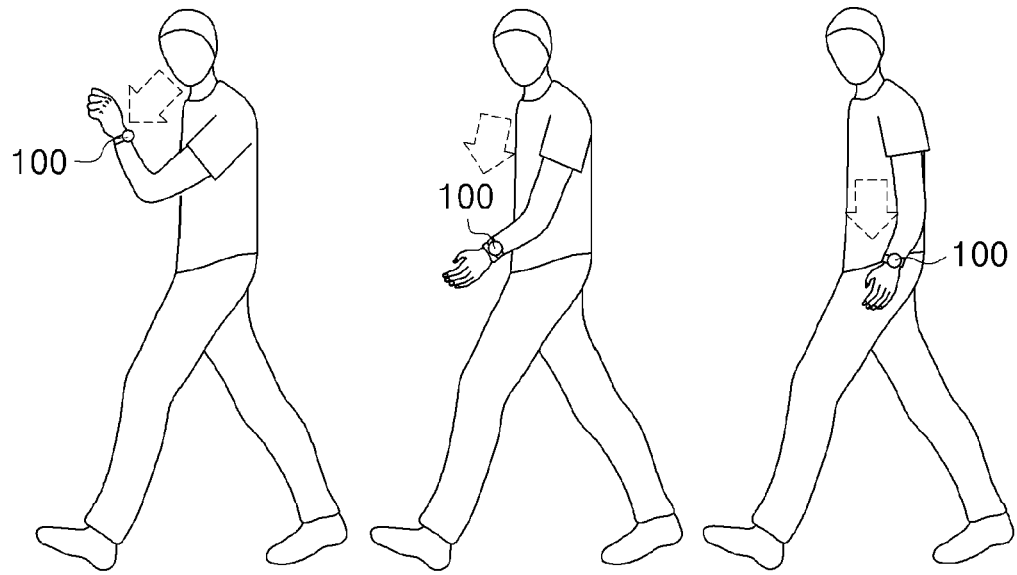
FIG. 4 is a diagram illustrating that a user is watching the wearable terminal worn by the user.
FIG. 5 is a diagram illustrating a motion of the wearable terminal while the user is walking.
FIG. 6 is a diagram illustrating a movement of the wearable terminal while the user stands still.

That is, when the wearable terminal 100 is watched by a user as illustrated in FIG. 4, the terminal mode determination unit 120 may set the terminal mode to the terminal watching mode. When an eye shape or face shape is detected through the camera 111 and a swing of the wearable terminal 100 is not detected through the gyro sensor 113, the terminal mode determination unit 120 may set the terminal mode to the terminal watching mode. When a user watches the wearable terminal 100 while standing still, no values are measured through the acceleration sensor 112 and the gyro sensor 113 because the wearable terminal 100 is not moved and swung. Furthermore, when a user watches the wearable terminal 100 while walking, acceleration may be measured in the wearable terminal 100 worn on the wrist of the user, but no swing angle is measured because the user does not swing or rotate the arm. Therefore, when an eye shape or face shape is detected through the camera 111 and a swing angle of the wearable terminal 100 is not detected through the gyro sensor 113, the terminal mode determination unit 120 may set the terminal mode to the terminal watching mode. For reference, in order to determine whether the wearable terminal 100 is not moved, the motion measurement sensor 114 may measure and average the motions of the wearable terminal 100 for a preset time. Furthermore, when the wearable terminal 100 is moved within a permissible range, the motion measurement sensor 114 may determine that the wearable terminal 100 is not moved.

Only when a user watches the wearable terminal 100 while standing still, the terminal mode determination unit 120 may set the terminal mode to the terminal watching mode, in order to accurately determine the terminal watching mode. In this case, only when an eye shape or face shape is detected through the camera 111 and no motions are measured through the acceleration sensor 112 and the gyro sensor 113, the terminal mode determination unit 120 may set the terminal mode to the terminal watching mode.

When the wearable terminal 100 is worn on the wrist of a user and swung by a walking motion of the user as illustrated in FIG. 5, the terminal mode determination unit 120 may set the terminal mode to the walking mode. When a motion of the wearable terminal 100 is detected through the motion measurement sensor 114, the terminal mode determination unit 120 set the terminal mode to the waling mode.

When the wearable terminal 100 is worn on the wrist of a user in an upright position and not moved for a preset time as illustrated in FIG. 6, the terminal mode determination unit 120 may set the terminal mode to the walking stop mode. That is, when the time during which an eye shape or face shape is not detected through the camera 111 and a motion of the terminal is not detected through the motion measurement sensor 114 is maintained for a preset time, the terminal mode determination unit 120 may set the terminal mode to the waling stop mode.

Figure 7:
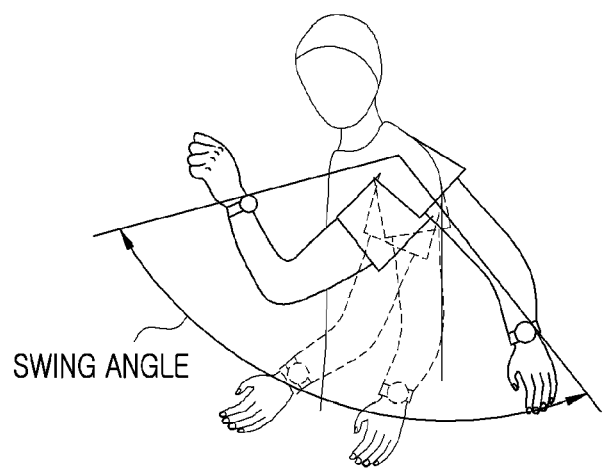
FIG. 7 is a diagram illustrating a swing angle of the wearable terminal when the user is walking.

When the wearable terminal 100 worn on the wrist of a user is swung out of a preset critical range or the swing range in which the user swings the arm while walking as illustrated in FIG. 7, the terminal mode determination unit 120 may determine that the corresponding mode is not the walking mode but an exception mode. In this mode, the information output unit 140 of the wearable terminal 100 may be turned off not to display navigation information. This is in order to turn off the wearable terminal when the wearable terminal is not worn on the wrist of a user.

The layout database 150 may store various types of layouts for displaying information on the screen, the layouts being allocated to the respective terminal modes. The layout database 150 may include a module capable of inputting/outputting information, such as SSD (Solid State Drive), Flash Memory, CF (Compact Flash) card, SD (Secure Digital) card, SM (Smart Media) card, MMC (Multi-Media) card or memory stick. The layout database 150 may be installed in the device or a separate device. FIG. 8 illustrates an example of the layout database 150 that stores various types of layouts for the respective terminal modes. A map information layout containing the largest amount of information loaded therein may be allocated to the terminal watching mode, a mini-information layout containing an intermediate amount of information loaded therein may be allocated to the walking mode, and a sign information layout containing the smallest amount of information loaded therein may be allocated to the walking stop mode. That is, under the supposition that the displayed information amounts have a relation of (first information amount>second information amount>third information amount), the layout database 150 may store the map information layout having the first information amount and allocated to the terminal watching mode, the mini information layout having the second information amount and allocated to the walking mode, and the sign information layout having the third information amount and allocated to the walking stop mode.

For reference, FIG. 9 illustrates configuration examples of the layouts depending on the terminal modes. Specifically, in the terminal watching mode, the wearable terminal 100 may be watched by a user, and the time during which the user can recognize information may increase while the user watches the screen for a preset time. Therefore, the map information layout may be applied to display the largest amount of recognizable information among the terminal modes. In the terminal watching mode, since the largest amount of information is displayed among the terminal modes, the size of contents of the displayed information may be set to the smallest size, and the number of displayed colors may be set to the largest value.

In the walking mode, when the user swings the arm in a predetermined range, the time during which the user watches the screen may decrease. Thus, the mini-information layout may be applied to expose and display only simple information. Therefore, the information amount, the size of displayed contents and the number of displayed colors may be set to intermediate values. That is, in the walking mode, the information amount may be smaller than in the terminal watching mode and larger than in the walking stop mode, the size of displayed contents may be larger than in the terminal watching mode and smaller than in the walking stop mode, and the number of displayed colors may be smaller than in the terminal watching mode and larger than in the walking stop mode.

In the walking stop mode, when the arm is out of sight, the sign information layout may be applied to expose a minimum amount of information. Therefore, since the smallest amount of information is displayed mode among the terminal modes, the size of the contents of displayed information may be set to the largest size, and the number of displayed colors may be set to the smallest value.

When the wearable terminal 100 is not worn on the wrist of a user but swung out of the preset critical range, the terminal mode determination unit 120 may determine that the corresponding mode is not the walking mode but an exception mode. In this mode, the information output unit 140 of the wearable terminal 100 may be turned off not to display navigation information. That is, when the swing angle of the wearable terminal 100, set by the user who swings the arm while walking, falls in the preset critical range (swing angle range) set to the arm swing range of the user as illustrated in FIG. 7, the terminal mode may be set to the walking mode, and when the swing angle of the wearable terminal 100 is out of the critical range (swing angle range), the terminal mode may be set to an exception mode in which the information output unit 140 of the wearable terminal 100 is turned off not to display navigation information.

The map information layout, the mini information layout and the sign information layout may be differently constructed for each piece of navigation information which is to be outputted through the information output unit 140. The displayed navigation information may include surroundings guide navigation information, path guide navigation information and charging station guide navigation information. Depending on each piece of navigation information, the map information layout, the mini-information layout and the sign information layout may be differently constructed.

Referring to FIG. 8, the respective layouts will be described in detail. In accordance with a first embodiment, when the navigation information is the surroundings guide navigation information, a first-first layout for displaying the entire screen in the form of a map may be allocated to the map information layout displayed in the terminal watching mode, a first-second layout in which the screen is divided into a plurality of parts and representative pieces of information in the respective parts are displayed on the respective parts of the map may be allocated to the mini-information layout displayed in the walking mode, and a first-third layout in which only one piece of representative guide information in the traveling direction is displayed as a sign may be applied to the sign information layout displayed in the walking stop mode. FIG. 10 is a diagram illustrating display screens of the navigation terminal 200 and display screens of the wearable terminal 100 depending on the respective pieces of navigation information. When surroundings guide navigation information is displayed, a map information layout represented by reference numeral 1011 may be implemented with the first-first layout for displaying the entire screen in the form of a map.

Similarly, when surroundings guide navigation information is displayed, a mini-information layout represented by reference numeral 1012 may be implemented with the first-second layout in which the screen displaying the map is divided into a plurality of parts and representative pieces of information in the respective parts are displayed on the respective parts of the map. For example, the circular wearable terminal screen represented by reference numeral 1012 may be divided into four parts, and the logos of representative companies located at the respective parts may be displayed on the respective parts of the map. The pieces of representative guide information displayed on the respective parts may be set based on information received from the navigation terminal 200.

Similarly, when surroundings guide navigation information is displayed, a sign information layout represented by reference numeral 1013 may be implemented with the first-third layout in which only one piece of representative guide information in the traveling direction is displayed as a sign. For example, the logo of a representative company located in the traveling direction may be displayed in the first-third layout.

In accordance with a second embodiment, when the navigation information is the path guide navigation information, a second-first layout in which the distances to traveling direction changing points and the traveling directions are displayed on the map screen as represented by reference numeral 1022 in FIG. 10 may be allocated to the map information layout, a second-second layout in which only the distance to a traveling direction changing point and the traveling direction are displayed as represented by reference numeral 1023 in FIG. 10 may be allocated to the mini-information layout, and a second-third layout in which the traveling direction is displayed with only an arrow when the vehicle reaches a traveling direction changing point as represented by reference numeral 1024 in FIG. 10 may be allocated to the sign information layout.

In accordance with a third embodiment, when the navigation information is the charging station guide navigation information, a third-first layout in which the distances to the nearest charging station and the second nearest charging station and the name of the nearest charging station are displayed as represented by reference numeral 1031 in FIG. 10 may be allocated to the map information layout, a third-second layout in which the distance to the nearest charging station from the current location of the wearable terminal 100 and the name of the nearest charging station are displayed as represented by reference numeral 1032 in FIG. 10 may be allocated to the mini-information layout, and a third-third layout in which a remaining distance to a charging station is displayed in color and the charging station is represented by a sign as represented by reference numeral 1033 in FIG. 10 may be allocated to the sign information layout.

The information output unit 140 may include an LED or OLED display screen, and display navigation information received from the navigation terminal 200. In addition to the information displayed on the screen of the navigation terminal 200 as indicated by reference numerals 1010, 1020 and 1030 in FIG. 10, the information output unit 140 of the wearable terminal 100 may output the screens indicated by 1011, 1012, 1013, 1021, 1022, 1023, 1031, 1032 and 1033 in FIG. 10.

The control unit 130 may extract a layout from the layout database 150 according to the terminal mode determined by the terminal mode determination unit 120, construct navigation information according to the extracted layout, and display the navigation information through the information output unit 140. When the terminal mode is set to the terminal watching mode, the control unit 130 may extract the map mode layout allocated to the terminal watching mode from the layout database 150 illustrated in FIG. 8. At this time, the layout extracted for each piece of navigation information may differ in the terminal watching mode.

For example, when the terminal mode is the terminal watching mode and the navigation information to be displayed is the surroundings guide navigation information, the control unit 130 may extract the first-first layout from the database illustrated in FIG. 8, construct a surroundings guide screen as indicated by reference numeral 1011 of FIG. 10 according to the first-first layout, and output the surroundings guide screen through the information output unit 140 of the wearable terminal 100. Similarly, when the terminal mode is the terminal watching mode and the navigation information to be displayed is the path guide navigation information, the control unit 130 may extract the second-first layout from the database illustrated in FIG. 8, construct a path guide screen as indicated by reference numeral 1021 of FIG. 10 according to the second-first layout, and output the path guide screen through the information output unit 140 of the wearable terminal 100. Similarly, when the terminal mode is the terminal watching mode and the navigation information to be displayed is the charging station guide navigation information, the control unit 130 may extract the third-first layout from the database illustrated in FIG. 8, construct a charging station guide screen as indicated by reference numeral 1031 of FIG. 10 according to the second-first layout, and output the charging station guide screen through the information output unit 140 of the wearable terminal 100.

Furthermore, when the terminal mode is the walking mode and the navigation information to be displayed is the surroundings guide navigation information, the control unit may extract the first-second layout from the database illustrated in FIG. 8, construct a screen by loading the navigation information on the surroundings guide screen as indicated by reference numeral 1012 of FIG. 10 according to the first-second layout, and output the screen through the information output unit 140 of the wearable terminal 100. Similarly, when the terminal mode is the walking mode and the navigation information to be displayed is the path guide navigation information, the control unit 130 may extract the second-second layout from the database illustrated in FIG. 8, construct a path guide screen as indicated by reference numeral 1022 of FIG. 10 according to the second-second layout, and output the path guide screen through the information output unit 140 of the wearable terminal 100. Similarly, when the terminal mode is the walking mode and the navigation information to be displayed is the charging station guide navigation information, the control unit 130 may extract the third-second layout from the database illustrated in FIG. 8, construct a charging station guide screen as indicated by reference numeral 1032 of FIG. 10 according to the third-second layout, and output the charging station guide screen through the information output unit 140 of the wearable terminal 100.

Furthermore, when the terminal mode is the walking stop mode and the navigation information is the surroundings guide navigation information, the control unit 130 may extract the first-third layout from the database illustrated in FIG. 8, construct a surroundings guide screen as indicated by reference numeral 1013 of FIG. 10 according to the first-third layout, and output the surroundings guide screen through the information output unit 140 of the wearable terminal 100. Similarly, when the terminal mode is the walking stop mode and the navigation information is the path guide navigation information, the control unit 130 may extract the second-third layout from the database illustrated in FIG. 8, construct a path guide screen as indicated by reference numeral 1023 of FIG. 10 according to the second-third layout, and output the path guide screen through the information output unit 140 of the wearable terminal 100. Similarly, when the terminal mode is the walking stop mode and the navigation information is the charging station guide navigation information, the control unit 130 may extract the third-third layout from the database illustrated in FIG. 8, construct a charging station guide screen as indicated by reference numeral 1033 of FIG. 10 according to the third-third layout, and output the charging station guide screen through the information output unit 140 of the wearable terminal 100.

The control unit 130 may set priorities for the respective pieces of navigation information, and output navigation information in descending order of priorities through the information output unit 140. For example, when the navigation information is the surroundings guide navigation information while the wearable terminal is operated in the walking mode, the logos of representative companies around the wearable terminal 100 may be displayed on the four parts of the screen as indicated by reference numeral 1012 of FIG. 10 in case where the information on the representative companies has the highest priority among the whole pieces of surroundings guide navigation information. Furthermore, when information on gas stations has the highest priority, the logos of representative gas stations in the respective four parts of the screen may be displayed in the walking mode.

Figure 11:
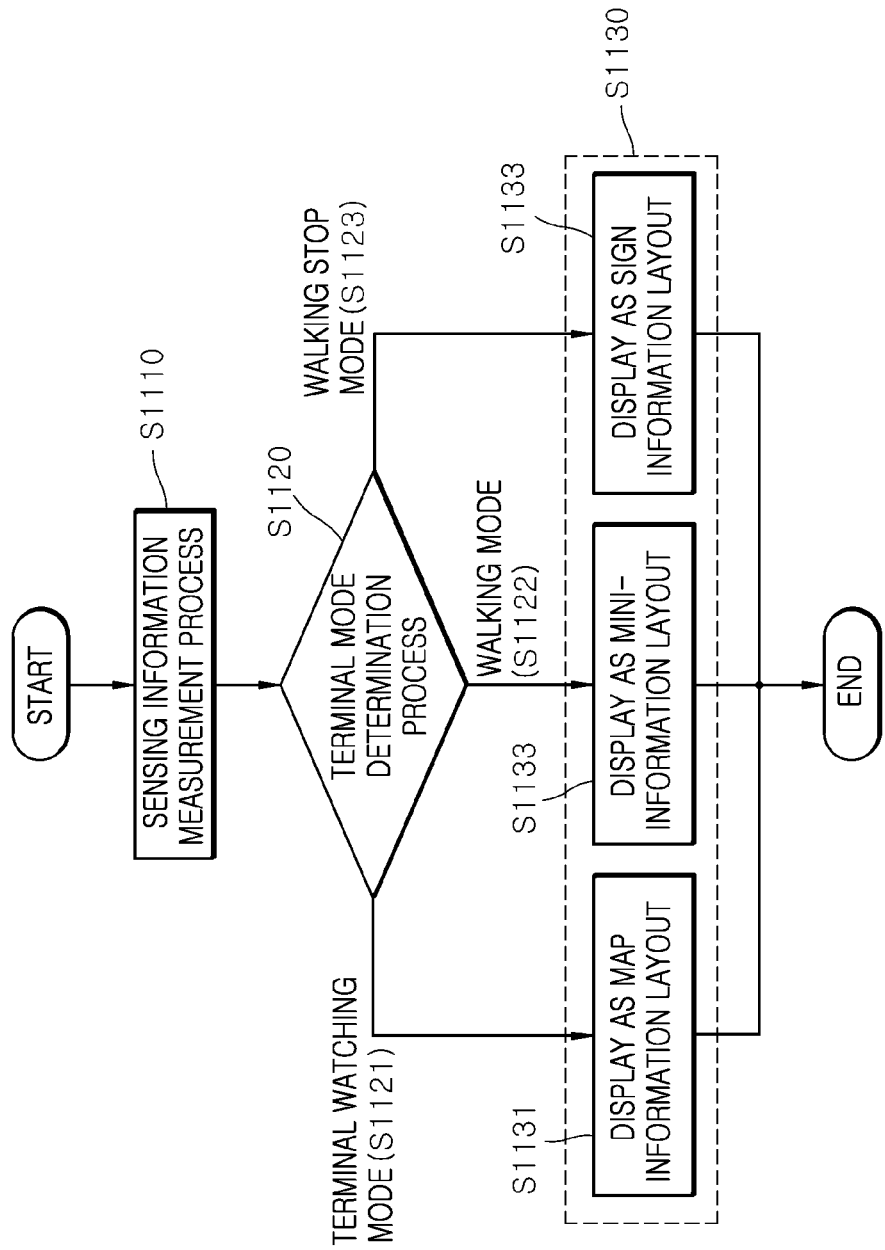
FIG. 11 is a flowchart illustrating an information display process of a wearable terminal in accordance with an embodiment of the present invention.

FIG. 11 is a flowchart illustrating an information display process of a wearable terminal in accordance with an embodiment of the present invention.

The information display process starts with step S1110 of measuring sensing information for determining the state of the wearable terminal 100. The measurement sensor may include the camera 111 and the motion measurement sensor 114 including the gyro sensor 113 and the acceleration sensor 112. Therefore, the sensing information may include image information taken by the camera 111, swing information obtained by sensing a swing of the wearable terminal 100, and a swing angle of the wearable terminal 100.

The measuring of the sensing information may include an image information measurement process of taking an image and a motion measurement process of measuring a motion of the wearable terminal 100.

When the measuring of the sensing information is completed, a terminal mode determination process may be performed at step S1120 to set the terminal mode to any one of the terminal watching mode, the walking mode and the walking stop mode, based on the measured sensing information. The terminal watching mode may refer to a mode in which a user watches the screen of the wearable terminal 100, the walking mode may refer to a mode in which the wearable terminal 100 is swung, and the walking stop mode may refer to a mode in which the wearable terminal 100 is not moved for a predetermined time.

That is, when the wearable terminal 100 is watched by a user as illustrated in FIG. 4, the terminal mode may be set to the terminal watching mode. When an eye shape or face shape is detected through the camera 111 and a motion of the wearable terminal 100 is not detected through the motion measurement sensor 114, the terminal mode may be set to the terminal watching mode, at step S1121.

Furthermore, when the wearable terminal 100 is worn on the wrist of a user and swung by a motion of the user as illustrated in FIG. 5, the terminal mode may be set to the walking mode. When a motion of the terminal is detected through the motion measurement sensor 114, the terminal mode may be set to the walking mode at step S1122.

Furthermore, when the wearable terminal 100 is worn on the wrist of a user in an upright position and not moved for a preset time as illustrated in FIG. 6, the terminal mode may be set to the walking stop mode at step S1123. When an eye shape or face shape is not detected through the camera 111 and a swing of the terminal is not detected through the gyro sensor 113 for a preset time, the terminal mode may be set to the walking stop mode. When no motion is detected through the acceleration sensor 112 or the gyro sensor 113, the terminal mode may also be set to the walking stop mode.

When the terminal mode is determined, a layout displayed on the screen may be differently constructed to display navigation information, depending on the determined terminal mode, a step S1130.

Different types of layouts are set for the respective terminal modes. In the terminal watching mode, the map information layout having the largest information amount may be constructed at step S1131. In the walking mode, the mini-information layout having the intermediate information amount may be constructed at step S1132. In the walking stop mode, the sign information layout having the smallest information amount may be constructed at step S1133. That is, under the supposition that the displayed information amounts have a relation of (first information amount>second information amount>third information amount), the layout database 150 may implement the map information layout having the first information amount in the terminal watching mode, implement the mini information layout having the second information amount in the walking mode, and implement the sign information layout having the third information amount in the walking stop mode.

Furthermore, the layouts depending on the respective terminal modes may be differently constructed for each piece of navigation information. That is, the map information layout, the mini information layout and the sign information layout may be differently constructed for each piece of navigation information which is to be outputted through the information output unit 140. The displayed navigation information may include the surroundings guide navigation information, the path guide navigation information and the charging station guide navigation information. Depending on the respective pieces of navigation information, the map information layout, the mini-information layout and the sign information layout may be differently constructed.

For example, when the navigation information is the surroundings guide navigation information, the first-first layout for displaying the entire screen in the form of a map may be allocated to the map information layout, the first-second layout in which the screen is divided into a plurality of parts and representative pieces of information in the respective parts are displayed on the respective parts of the map may be allocated to the mini-information layout, and the first-third layout in which only one piece of representative guide information in the traveling direction is displayed as a sign may be applied to the sign information layout. For reference, FIG. 10 shows the display screens of the navigation terminal 200 and the display screens of the wearable terminal 100 depending on the respective pieces of navigation information.

Furthermore, when the wearable terminal 100 is not worn on the wrist of a user but swung out of the preset critical range, it may indicate an exception mode, not the walking mode. In this mode, the information output unit 140 of the wearable terminal 100 may be turned off not to display navigation information. That is, when the swing angle of the wearable terminal 100, set by the user who swings the arm while walking, falls in the preset critical range (swing angle range) set to the arm swing range of the user as illustrated in FIG. 7, the walking mode may be set to normally display the navigation information. However, when the swing angle of the wearable terminal 100 is out of the critical range, the terminal mode may be set to an exception mode, and the information output unit 140 of the wearable terminal 100 may be turned off not to display navigation information. That is because, while the wearable terminal 100 is not worn by a user, the wearable terminal 100 does not need to display navigation information.

During the information display process, the navigation information may be displayed in descending order of priority. For example, when the navigation information is the surroundings guide navigation information while the wearable terminal is operated in the walking mode, the logos of representative companies around the wearable terminal 100 may be displayed on the four parts of the screen as indicated by reference numeral 1012 of FIG. 10 in case where the information on the representative companies has the highest priority among the whole pieces of surroundings guide navigation information. Furthermore, when information on gas stations has the highest priority, the logos of representative gas stations in the respective four parts of the screen may be displayed in the walking mode. The priority may be set at the initial stage, but changed by the user's setting.

When the navigation information is displayed on the wearable terminal 100, the navigation information received from the navigation terminal 200 such as a smart phone may be displayed on a different layout for each terminal mode. As such, when the navigation information received from the navigation terminal 200 is displayed, the navigation terminal 200 may transmit the navigation information to the wearable terminal 100 through NFC such as Bluetooth at step S1200 as illustrated in FIG. 12. The navigation terminal 200 may display the surroundings guide navigation information and transmit the surroundings guide navigation information to the wearable terminal 100 at normal times. However, when a drive path is set, the navigation terminal 200 may transmit the path guide navigation information, and when the smart phone or the wearable terminal 100 needs to be charged, the navigation terminal 200 may transmit the charging station guide navigation information.

Then, the wearable terminal 100 may go through a sensing information measurement step S1210 and a terminal mode determination step S1220, and then construct a layout for each terminal mode to display the navigation information received from the navigation terminal 200, at step S1230.

Although some embodiments have been provided to illustrate the invention in conjunction with the drawings, it will be apparent to those skilled in the art that the embodiments are given by way of illustration only, and that various modifications and equivalent embodiments can be made without departing from the spirit and scope of the invention. The scope of the invention should be limited only by the accompanying claims.

The invention claimed is:

1. A wearable terminal comprising:
a terminal mode determination unit configured to determine any one of a plurality of terminal modes based on a use state of the terminal;
an information output unit configured to display navigation information;
a layout database configured to store a layout to be displayed on the information output unit, in response to each of the terminal modes;
a control unit configured to extract a layout corresponding to the determined terminal mode from the layout database, construct navigation information according to the extracted layout, and output the navigation information through the information output unit; and
a sensor input unit configured to receive sensing information for determining the use state of the terminal,
wherein the terminal mode determination unit determines the terminal mode based on the sensing information,
wherein the plurality of terminal modes comprise two or more of a terminal watching mode in which a user watches a screen of the wearable terminal a walking mode in which the wearable terminal is being swung, and a walking stop mode in which the wearable terminal is not moved for a preset time,
wherein the sensor input unit comprises:
a camera configured to take an image; and
a motion measurement sensor configured to measure a motion of the wearable terminal, and
wherein the terminal mode determination unit sets the terminal watching mode as the terminal mode when an eye shape or face shape is detected through the camera and a swing of the wearable terminal is not detected through the motion measurement sensor, sets the walking mode as the terminal mode when the motion of the wearable terminal is detected through the motion measurement sensor, and sets the walking stop mode as the terminal mode when the eye shape or the face shape is not detected through the camera and the time during which the motion of the wearable terminal is not detected through the motion measurement sensor lasts for at least a preset time.

2. The wearable terminal of claim 1, wherein when a motion range of the wearable terminal, detected through the motion measurement sensor, is out of a preset critical range, the control unit turns off the information output unit not to display navigation information.

3. The wearable terminal of claim 1, wherein the layout database stores a first layout displaying a first information amount and allocated to the terminal watching mode, a second layout displaying a second information amount and allocated to the walking mode, and a third layout displaying a third information amount and allocated to the walking stop mode.

4. The wearable terminal of claim 3, wherein the displayed first, second and third information amounts have a relation of (first information amount>second information amount>third information amount),
wherein the first layout is a map information layout displaying the first information amount in the terminal watching mode, the second layout is a mini-information layout displaying the second information amount in the walking mode, and the third layout is a sign information layout displaying the third information amount in the walking stop mode.

5. The wearable terminal of claim 4, wherein the map information layout, the mini-information layout and the sign information layout are differently constructed for each piece of navigation information to be outputted through the information output unit.

6. The wearable terminal of claim 5, wherein when the navigation information is surroundings guide navigation information, the map information layout is where an entire screen is displayed in the form of a map, the mini-information layout is where the map-displayed screen is divided into a plurality of parts and representative pieces of guide information in the respective parts are displayed on the respective parts of the map, and the sign information layout is where only one piece of representative guide information in a traveling direction is displayed as a sign.

7. The wearable terminal of claim 5, wherein when the navigation information is path guide navigation information, the map information layout is where a distance to a traveling direction changing point and a traveling direction are displayed on a map screen, the mini-information layout is where only the distance to the traveling direction changing point and the traveling direction are displayed, and the sign information layout is where the traveling direction is displayed only with an arrow when a vehicle reaches the traveling direction changing point.

8. The wearable terminal of claim 5, wherein when the navigation information is charging station guide navigation information, the map information layout is where distances to the nearest charging station and the second nearest charging station and a name of the nearest charging station are displayed, the mini-information layout is where the distance to the nearest charging station and the name of the nearest charging station are displayed, and the sign information layout is where a remaining distance to a charging station is displayed in a color and the charging station is displayed as a sign.

9. An information display method of a wearable terminal, the method comprising:
determining, by a terminal mode determination unit, any one of a plurality of terminal modes based on a use state of the terminal; and
extracting, by a control unit, a layout corresponding to the determined terminal mode from layout database, constructing navigation information according to the extracted layout, and outputting the navigation information through an information output unit,
wherein the layout database stores a layout of information to be displayed on the information output unit in response to each of the terminal modes, and
wherein the information display method further comprises receiving, by a sensor input unit, sensing information for determining the use state of the terminal,
wherein the terminal mode determination unit determines the terminal mode based on the sensing information,
wherein the plurality of terminal modes comprise two or more of a terminal watching mode in which a user watches a screen of the wearable terminal, a walking mode in which the wearable terminal is being swung, and a walking stop mode in which the wearable terminal is not moved for a preset time, and
wherein the sensor input unit comprises: a camera configured to take an image; and a motion measurement sensor configured to measure a motion of the wearable terminal, and
wherein the determining of the terminal mode comprises:
setting the terminal watching mode as the terminal mode when an eye shape or a face shape is detected through the camera and a swing of the wearable terminal is not detected through the motion measurement sensor;
setting the walking mode as the terminal mode when the motion of the wearable terminal is detected through the motion measurement sensor; and
setting the walking stop mode as the terminal mode when the eye shape or the face shape is not detected through the camera and the time during which the motion of the wearable terminal is not detected through the motion measurement sensor lasts for at least a preset time.

10. The information display method of claim 9, further comprising:
turning off, by the control unit, the information output unit when a motion range of the wearable terminal, detected through the motion measurement sensor, is out of a preset critical range.

11. The information display method of claim 9,
wherein the layout database stores a first layout displaying a first information amount and allocated to the terminal watching mode, a second layout displaying a second information amount and allocated to the walking mode, and a third layout displaying a third information amount and allocated to the walking stop mode.

12. The information display method of claim 11, wherein when the navigation information is surroundings guide navigation information, the map information layout is where an entire screen is displayed in the form of a map, the mini-information layout is where the map-displayed screen is divided into a plurality of parts and representative pieces of guide information in the respective parts are displayed on the respective parts of the map, and the sign information layout is where only one piece of representative guide information in a traveling direction is displayed as a sign.

13. The information display method of claim 11, wherein when the navigation information is path guide navigation information, the map information layout is where a distance to a traveling direction changing point and a traveling direction are displayed on a map screen, the mini-information layout is where only the distance to the traveling direction changing point and the traveling direction are displayed, and the sign information layout is where the traveling direction is displayed only with an arrow when a vehicle reaches the traveling direction changing point.

14. The information display method of claim 11, wherein when the navigation information is charging station guide navigation information, the map information layout is where distances to the nearest charging station and the second nearest charging station and a name of the nearest charging station are displayed, the mini-information layout is where the distance to the nearest charging station and the name of the nearest charging station are displayed, and the sign information layout is where a remaining distance to a charging station is displayed in a color and the charging station is displayed as a sign.

15. A navigation information display device comprising:
a navigation terminal configured to transmit navigation information; and
a wearable terminal configured to receive the navigation information from the navigation terminal, differently construct a layout displayed on a screen depending on a terminal mode, and display the navigation information,
wherein the wearable terminal comprises:
- a sensor input unit configured to receive sensing information for determining a use state of the terminal;
- a terminal mode determination unit configured to determine any one of a plurality of terminal modes based on the sensing information;
- an information output unit configured to display the navigation information;
- a layout database configured to store a layout to be displayed on the information output unit, in response to each of the terminal modes, and
- a control unit configured to extract a layout corresponding to the determined terminal mode from the layout database, construct navigation information according to the extracted layout, and output the navigation information through the information output unit, wherein the plurality of terminal modes comprise at least a terminal watching mode in which a user watches the screen of the wearable terminal, a walking mode in which the wearable terminal is being swung, and a walking stop mode in which the wearable terminal is not moved for a preset time, wherein the sensor input unit comprises:
- a camera configured to take an image; and
- a motion measurement sensor configured to measure a motion of the wearable terminal, and wherein the terminal mode determination unit sets the terminal watching mode as the terminal mode when an eye shape or face shape is detected through the camera and a swing of the wearable terminal is not detected through the motion measurement sensor, sets the walking mode as the terminal mode when a motion of the wearable terminal is detected through the motion measurement sensor, and sets the walking stop mode as the terminal mode when the eye shape or the face shape is not detected through the camera and the time during which the motion of the wearable terminal is not detected through the motion measurement sensor lasts for at least a preset time.

16. The information display method of claim 11, wherein the displayed first, second and third information amounts have a relation of (first information amount>second information amount>third information amount), and
wherein the first layout is a map information layout displaying the first information amount in the terminal watching mode, the second layout is a mini-information layout displaying the second information amount in the walking mode, and the third layout is a sign information layout displaying the third information amount in the walking stop mode.

* * * * *